No. 776,674. PATENTED DEC. 6, 1904.
B. NÖLDNER.
APPARATUS FOR TREATING FLAX.
APPLICATION FILED DEC. 24, 1903.
NO MODEL.
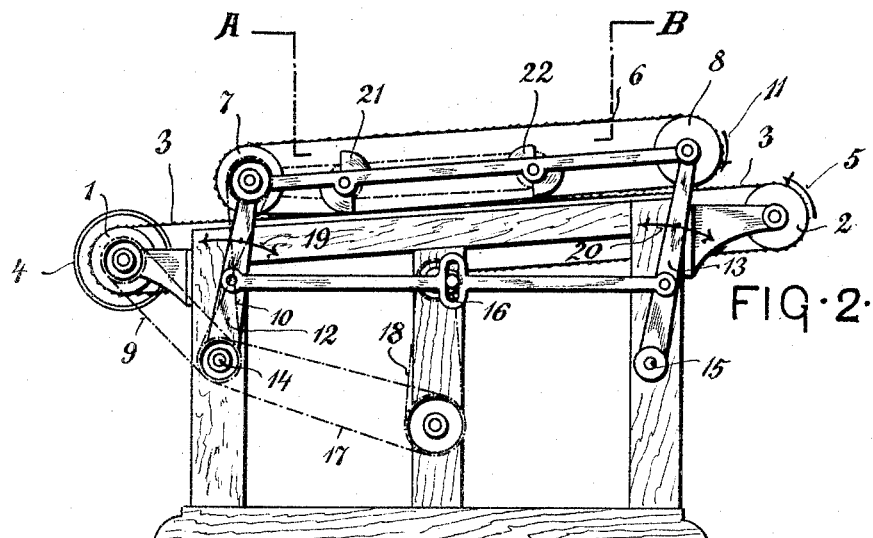
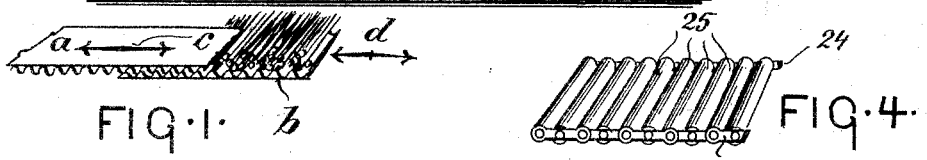
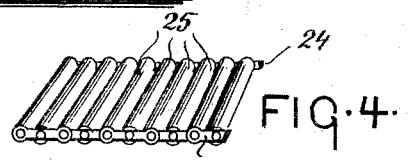
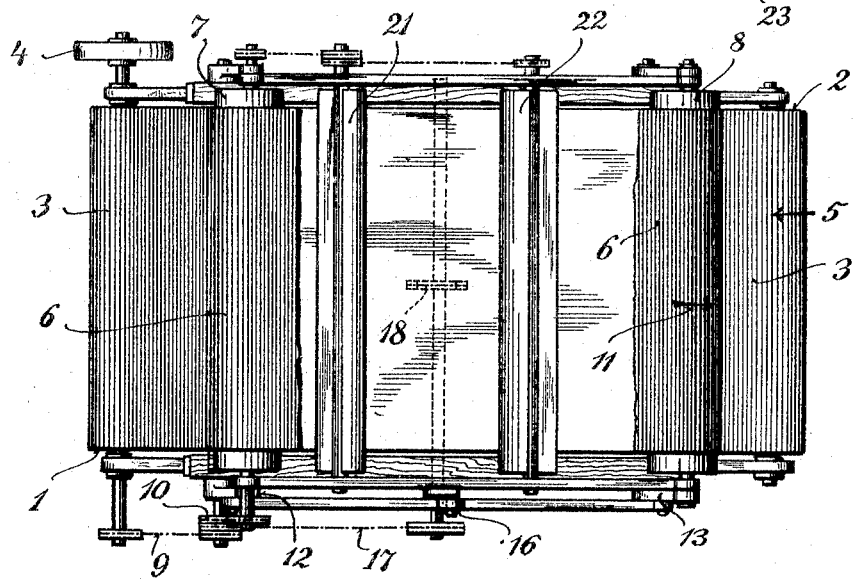
Witnesses:
Inventor:

No. 776,674. Patented December 6, 1904.

UNITED STATES PATENT OFFICE.

BRUNO NÖLDNER, OF BRESLAU, GERMANY.

APPARATUS FOR TREATING FLAX.

SPECIFICATION forming part of Letters Patent No. 776,674, dated December 6, 1904.

Application filed December 24, 1903. Serial No. 186,436. (No model.)

*To all whom it may concern:*

Be it known that I, BRUNO NÖLDNER, a citizen of Germany, residing at Breslau, Province of Silesia, Germany, have invented certain new and useful Improvements in Apparatus for Treating Flax; and I do hereby declare the following to be a full, clear, and exact description of the invention, such as will enable others skilled in the art to which it appertains to make and use the same.

Hitherto flax-stalks have been freed from the bolls by being beaten with suitable devices in the manner of threshing or being passed between rollers, whereby the bolls were crushed. None of these methods, however, meets the requirements of the case. The beating of the flax certainly removes the pods from the stalks; but the stalks get out of order and so much time is spent in putting them straight in order to bind them that the advantages of the beating process are counterbalanced. In the case where rollers are employed there is a disadvantage that the pods which are still somewhat fresh are certainly crushed, but not freed from the stalks. Again, under this process also the stalks do not keep even, as the material passed between the rollers adheres to the rollers in the places where it lies more closely heaped and is torn by the roller, while the more thinly-heaped places remain. Hereby, likewise, the stalks are displaced in relation to each other, so that it is necessary to arrange them evenly again before the binding is effected.

The present process is intended to obviate these disadvantages.

It consists in laying the flax between two grooved bodies which are then rubbed together. The pods are thus not only crushed but completely removed from the stalks by the frictional action. The grooving of the devices at the same time has the effect of keeping the stalks straight together.

The process is illustrated in Figure 1 of the accompanying drawings. The two bodies 3 and 6 have corrugated surfaces and are pushed one against the other in the direction of the arrows 5 11. The stalks are laid between the two bodies 3 6, and it will be seen that when the bodies are rubbed one against the other the pods are crushed and removed from the stalks. The stalks are pressed into the grooves in the corrugated surfaces, so that the stalks are kept straight during the treatment by means of the grooves.

A machine for the continuous treatment of the flax by the above process is illustrated in the accompanying drawings, Fig. 2 being a side elevation, and Fig. 3 a plan, with a part A B, Fig. 2, broken away. Fig. 4 is a detail view.

Over the rollers 1 2 runs an endless band 3 with a grooved surface. Corrugated sheet metal with short corrugations is most suitable for this. The roller 1 is rotated in the usual manner by means of the belt-pulley 4, so that the band 3 moves in the direction of the arrow 5. A second similar endless band 6 runs over the rollers 7 8, which by means of chain-wheel gear 9 10 are driven from the roller 1, so that the band 6 moves in the direction of the arrow 11. In the form of the invention illustrated the bands 3 and 6 run at the same speed. The rollers 7 and 8 are mounted in arms 12 and 13, which are pivoted in the frame at 14 15. By means of a crank-slide 16 or its equivalent, which is actuated by the chain-wheel gear 17 18, the arms 12 13 are moved as indicated by the arrows 19 20. Hereby a short reciprocatory movement is imparted to the band 6. In the form of the invention shown is a further device, which is intended to insure that any pods lying between the stalks and which would leave the machine without being affected if the pressure on the layer of flax were uniform shall come under treatment. This device consists of eccentric rollers 21 22, which being rotated act on the band 6, so that the same is alternately forcibly pressed against the band 3 and released again. Thereby the flax between the bands 3 and 6 has an opportunity during its passage through the machine to yield to the pods lying between the stalks, so that the pods can come on to the grooved surface of the bands 3 and 6. In this way, as experiments have proved, the flax-stalk is completely freed from the pods without any change in the position of the stalks.

Instead of bands made of corrugated metal two endless chains 23 24, as seen in Fig. 4, may be employed, between which rotary rollers 25 are mounted, so that the grooved surface is created by these rollers 26 instead of by the corrugations of the metal. While in the first form of the invention the seed and the husk only leave the machine when the band 3 bends down around the roller 1 in the form shown in Fig. 4, the seed and the husk pass out at the bottom of the machine while the flax is passing through it.

If suitable bands 6 and 3 be employed, this machine may be used for treating clover.

Having now particularly described and ascertained the nature of my said invention and in what manner the same is to be performed, I declare that what I claim is—

1. In a machine for treating flax, the combination of two grooved belts or aprons, means for moving adjacent surfaces of the aprons in the same direction, and means for longitudinally reciprocating one apron independently of the other apron, substantially as described.

2. In a machine for treating flax, the combination of two grooved belts or aprons, means for moving adjacent surfaces of the aprons in the same direction, means for longitudinally reciprocating one apron independently of the other aprons and means for intermittently pressing portions of the longitudinally movable and reciprocable apron toward the other apron, substantially as described.

3. In a machine for treating flax, the combination of two grooved belts or aprons, means for moving adjacent surfaces of the aprons in the same direction, means for longitudinally reciprocating one apron independently of the other apron, and cams for intermittently pressing portions of the longitudinally movable and reciprocable apron toward the other apron, substantially as described.

In testimony whereof I affix hereto my signature in presence of two witnesses.

BRUNO NÖLDNER.

Witnesses:
ERNST KATZ,
ALBERT SCHENK.